US012743603B2

(12) United States Patent
Zhao et al.

(10) Patent No.: US 12,743,603 B2
(45) Date of Patent: Sep. 22, 2026

(54) KNOWLEDGE GRAPH REASONING MODEL, SYSTEM, AND REASONING METHOD BASED ON BAYESIAN FEW-SHOT LEARNING

(71) Applicant: Huazhong University of Science and Technology, Wuhan City (CN)

(72) Inventors: Feng Zhao, Wuhan City (CN); Cheng Yan, Wuhan City (CN); Hai Jin, Wuhan City (CN)

(73) Assignee: Huazhong University of Science and Technology, Wuhan City (CN)

(*) Notice: Subject to any disclaimer, the term of this patent is extended or adjusted under 35 U.S.C. 154(b) by 971 days.

(21) Appl. No.: 17/938,058

(22) Filed: Oct. 5, 2022

(65) Prior Publication Data

US 2023/0351153 A1 Nov. 2, 2023

(51) Int. Cl.

| | |
|---|---|
| ***G06N 3/042*** | (2023.01) |
| ***G06N 3/047*** | (2023.01) |
| ***G06N 3/08*** | (2023.01) |

(52) U.S. Cl.
CPC ............. *G06N 3/042* (2023.01); *G06N 3/047* (2023.01); *G06N 3/08* (2013.01)

(58) Field of Classification Search
CPC ........... G06N 3/042; G06N 3/047; G06N 3/08
See application file for complete search history.

(56) References Cited

U.S. PATENT DOCUMENTS

2020/0380385 A1* 12/2020 Li ........................... G06F 40/20
2021/0224690 A1* 7/2021 Albooyeh .............. G06N 5/022
2023/0117307 A1* 4/2023 Kim ...................... G06F 18/214
382/159

FOREIGN PATENT DOCUMENTS

CN 112084344 12/2020

OTHER PUBLICATIONS

Wan et.al, "GaussianPath:A Bayesian Multi-Hop Reasoning Framework for Knowledge Graph Reasoning", May 18, 2021 (Year: 2021).*

(Continued)

*Primary Examiner* — Alexey Shmatov
*Assistant Examiner* — Duy T Diep
(74) *Attorney, Agent, or Firm* — Michael Ye; Kalos Athena Wang PLLC

(57) ABSTRACT

The present invention relates to knowledge graph reasoning model, system and reasoning method based on Bayesian few-shot learning, wherein the method at least comprises: building a Gaussian mixture model to entities and relations in a knowledge graph so as to reduce uncertainty of the knowledge graph; taking each said entity as a task to simulate a meta-training process of a newly appearing entity in the dynamic knowledge graph and perform task sampling; constructing a meta learner based on a graph neural network and conducing random reasoning; and training the meta learner so as to use a support set to represent the newly appearing entity. The trained knowledge graph reasoning model in the present invention is highly adaptive and able to infer new facts or new entities without retraining.

6 Claims, 1 Drawing Sheet

(56) References Cited

OTHER PUBLICATIONS

He et.al, "Learning to Represent Knowledge Graphs with Gaussian Embedding", Oct. 17, 2015 (Year: 2015).*
Zhang et.al, "Meta-Learning Based Hyper-Relation Feature Modeling for Out-of-Knowledge-Base Embedding", Oct. 30, 2021 (Year: 2021).*
Li et.al, "Meta-SGD: Learning to Learn Quickly for Few-Shot Learning", Sep. 28, 2017 (Year: 2017).*

* cited by examiner

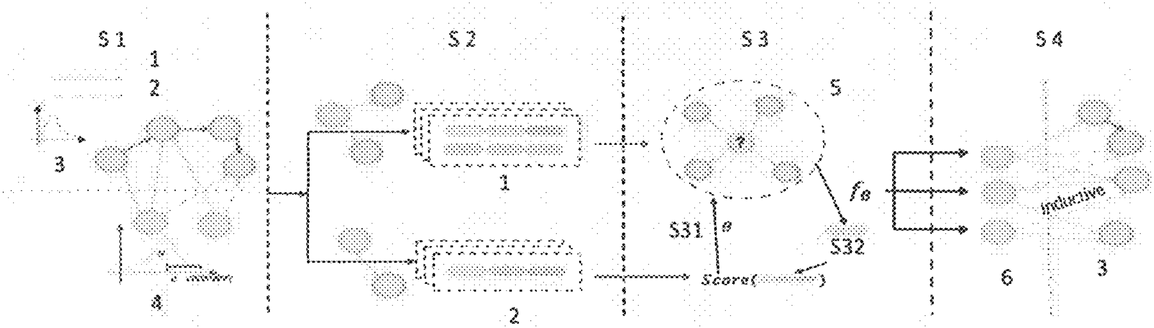
S1
1
2
3
4
S2
1
2
S3
5
S31
S32
$f_\theta$
S4
inductive
6
3

KNOWLEDGE GRAPH REASONING MODEL, SYSTEM, AND REASONING METHOD BASED ON BAYESIAN FEW-SHOT LEARNING

This application claims the benefits of the Chinese Application No. CN202210490126.6 filed Apr. 29, 2022, which is hereby incorporated by reference as if fully set forth herein.

BACKGROUND OF THE INVENTION

Technical Field

The present invention relates to the technical field of knowledge graph reasoning model, and more particularly to knowledge graph reasoning model, system and reasoning method based on Bayesian few-shot learning.

Description of Related Art

Large-scale knowledge graphs, such as YAGO, NELL, and Wikidata, contain large amounts of factual knowledge and have been taken as the background in numerous applications. With the rapid development of knowledge graph reasoning, its extensive application in recommending systems and answering questions has received increasing attention. The purpose of knowledge graph reasoning is to infer new facts from existing knowledge graphs. Typically, a knowledge graph is modeled as a link-prediction question for predicting new entities or relation in a query triple.

Many studies have provided substantial contribution to knowledge graph reasoning. Therein, one of the most popular methods is knowledge-graph-based embedding. This method is about mapping the entire knowledge graph to a multi-dimensional space, scoring triples using various vector operations, and predicting new triples. In virtue of its advantages in simplicity and precision, knowledge-graph-based embedding is highly valued. However, this approach has its limits.

It is well-recognized that knowledge is not something static, but dynamic and keeps developing with time. This fact means that knowledge graphs change with time as new knowledge appears and old knowledge turns outdated. For example, in these years, there are about 200 entities appearing in DBpedia ever day. Two challenges in knowledge-graph-embedding reasoning are discussed herein. The first one is poor scalability. As a transductive approach, knowledge graph embedding is not suitable for newly appearing entities. This is because when a new entity appears, the model has to be re-trained from the beginning. The transductive method depends on representation of entities and relation, and is incapable of generalization for invisible entities as the inductive method can do. Secondary, long-tail distribution is often seen in knowledge graphs due to the accumulative effects over time. Most entities only have a few triples associated with the original knowledge graphs. However, in the transductive method, it is assumed that every entity has sufficient training data, and this leads to uncertain representation and unreliable reasoning. Besides, since knowledge graphs are constructed by means of crowdsourcing and intelligent extraction, there are often some noise or ambiguous questions in them, adding uncertainty to knowledge graphs.

For example, China patent No. CN112084344A discloses a knowledge graph reasoning method, which comprises: acquiring initial knowledge graph data to be complemented, wherein the initial knowledge graph data comprises a plurality of initial data sets, and the initial data sets only comprise head entities and entity relations; and calling a knowledge graph reasoning model to obtain completed target knowledge graph data according to the initial knowledge graph data, wherein the knowledge graph reasoning model is a model obtained by pre-training based on reinforcement learning, and each target data group in the target knowledge graph data comprises a head entity, an entity relation and a tail entity. According to the embodiments of that prior patent, a knowledge graph reasoning model obtained through reinforcement learning is called to reason knowledge for an initial knowledge graph. The known approach nevertheless pays no attention to change over time and tries to complement a knowledge graph by means of repeated training.

Hence, how to efficiently deal with entities newly appearing in a knowledge graph with uncertainty of knowledge reasoning in mind is the key issue to be addressed in the present invention.

In addition, on the one hand, due to the differences in the understanding of those skilled in the art; on the other hand, due to the fact that the applicant studied a large amount of literature and patents when putting the invention, but space limitations do not allow all the details and content are described in detail, however, this does not mean that the invention does not have these prior art features, on the contrary, the present invention already has all the features of the prior art, and the applicant reserves the right to add relevant prior art to the background technology.

SUMMARY OF THE INVENTION

In view that uncertainty is a defect in existing knowledge graph reasoning models that causes long-tail distribution of training samples and that the known representational learning methods are all transductive and therefore not applicable to invisible entities, the present invention provides a Bayesian inductive reasoning method based on few-shot learning. For achieving scalability, the present invention applies meta learning to ISerform inductive reasoning for invisible entities and has a Bayesian graph neural network constructed as a meta learner that enables inference of knowledge from an initial knowledge graph to invisible entities. The trained knowledge graph reasoning model is highly adaptive and able to infer new facts or new entities without retraining. The present invention models uncertainty in the knowledge graph, which means that all entities and relations are included in a Gaussian mixture model. Additionally, as newly appearing entities are usually highly uncertain, the present invention incorporates a Bayesian graph neural network, a model that can estimate uncertainty, into the design of its meta learner, so as to achieve reasoning for a knowledge graph with uncertainty in dynamic scenarios.

In real-world knowledge graphs, only a few entities can have associated triples that contain plenty of data, while most entities only have a few triples. This phenomenon where neighbors have uneven number distributions is known as long-tail distributions.

In response to a deficiency of the prior art, the present invention provides a method for knowledge graph reasoning based on Bayesian few-shot learning, at least comprising:

building a Gaussian mixture model based on entities and relations in a knowledge graph so as to reduce uncertainty of the knowledge graph;

taking each said entity as a task to simulate a meta-training process of a newly appearing entity in the dynamic knowledge graph and perform task sampling;

constructing a meta learner based on a graph neural network and conducing random reasoning; and training the meta learner so as to use a support set to represent the newly appearing entity.

The present invention allows inference of knowledge from an initial knowledge graph to invisible entities. The trained knowledge graph reasoning model is highly adaptive and able to infer new facts or new entities without retraining. Additionally, as newly appearing entities are usually highly uncertain, the present invention incorporates a Bayesian graph neural network, a model that can estimate uncertainty, into the design of its meta learner, so as to achieve reasoning for a knowledge graph with uncertainty in dynamic scenarios.

Preferably, the step of building a Gaussian mixture model based on entities and relations in a knowledge graph comprises:

representing the head entity, the relation, and the tail entity as: $e_h \sim \mathcal{N}(\mu_h, \Sigma_h)$, $r \sim \mathcal{N}(\mu_r, \Sigma_r)$, $e_t \sim \mathcal{N}(\mu_t, \Sigma_t)$, respectively, where μ represents locations of the entity or the relation in a vector space, and Σ represents a covariance whose magnitude is in positive correlation with uncertainty of the relation or the entity;

representing conversion from the head entity to the tail entity as $$(e_t - e_h) \sim N\left(\mu_t - \mu_h, \sum_h + \sum_i\right); \text{ and}$$

defining a score function based on KL divergence and computing reliability of a triple using the score function.

The parameters for the meta learner can be optimized by computing reliability of triples.

Preferably, the score function used to compute the reliability of the triple is:

$$s(e_h, r, e_t) = KL(P_r, P_p),$$

where, s represents the score function of the triple, $e_h$ represents the head entity, r represents the relation, $e_t$ represents the tail entity, $P_r$ represents relation distribution, and $P_e$ represents transformation distribution.

Preferably, the step of taking each said entity as a task to simulate a meta-training process of a newly appearing entity in the dynamic knowledge graph and perform task sampling at least comprises:

partitioning an original dataset into at least a meta training dataset that contains simulated newly appearing entity and a meta testing dataset that contains actual newly appearing entity;

sampling the simulated newly appearing entity based on a meta-training process of the meta training dataset; and maximizing a score of the triple of the query set based on a score function.

Preferably, the step of constructing a meta learner based on a graph neural network at least comprises:

constructing the meta learner based on the Bayesian neural network and relations in the knowledge graph, so that the meta learner is represented as:

$$f_\theta = \frac{1}{|nei(\varsigma_i)|} \sum_{(r,e) \in neil(\varsigma_i)} B[r \| e]$$

where, $f(\theta)$ represents a weight value, B represents the Bayesian neural network, $|nei(\mathcal{S}_i)|$ represents a number of relation-entity pairs connected to the entity $$e_i'; \text{ and}$$

modeling based on the weight value $f(\theta)$, and by learning prior distribution following the Bayesian neural network, and reasoning uncertainty of newly emerging entities.

In the present invention, the meta learner is capable of using the support set to represent real, new entities without fine-tuning or re-training.

Preferably, the step of training the meta learner at least comprises:

computing a gradient in a loss function based on the query set and a negative query set, thereby updating and optimizing parameters of a reasoning model of the knowledge graph based on gradient descent data; and training the meta learner with the support set $S_t$ taken as an input and a representation of $$e_i'$$

taken as an output, $$e_i' = f_{\theta \sim P,(\theta|D)}(S_i),$$

where, $f(\theta)$ represents the weight value, $S_i$ represents the support set, and $e_i'$ represents a newly appearing entity.

Preferably, the step of training the meta learner further comprises:

minimizing KL divergence between the prior distribution and posterior distribution:

$$L(\theta^*) = \min_\theta KL(q(\theta) \| Pr(\theta \mid D));$$

so that an objective function is represented as:

$$L(\theta) = KL((q(\theta) \| Pr(\theta)) - \mathbb{E}_{\theta \sim q(\theta)}[\log Pr(D|\theta)];$$

where, $q(\theta)$ represents a hypothesis distribution for fitting $Pr(\theta)$, $Pr(\theta)$ represents real distribution of the parameter, and $Pr(D|\theta)$ represents distribution of the training dataset.

Herein, KL divergence is used as the score function for computing reliability of triples in the knowledge graph. As posteriors of these Gaussian distributions become convergent in training, uncertainty in the knowledge graph will reduce and be fit.

Preferably, the newly appearing entities in the meta training dataset $M_{tr}$ include:

the corresponding support set $$S_i = \{(e_i', r_j, e_j)\}_{j=1}^N, \text{ and}$$

query set $$Q_i = \{(e_i', r_j, e_j)\}_{j=N+1}^{n(e_i)};$$

where, $$n(e_i')$$

represents a number of triples adjacent to the newly appearing entity, N represents a few-shot size, and $$e_i'$$

represents the newly appearing entity.

The present invention further provides a system for knowledge graph reasoning based on Bayesian few-shot learning, at least comprising a processor, which is configurated:

- building a Gaussian mixture model based on entities and relations in a knowledge graph so as to reduce uncertainty of the knowledge graph;
- taking each said entity as a task to simulate a meta-training process of a newly appearing entity in the dynamic knowledge graph and perform task sampling;
- constructing a meta learner based on a graph neural network and conducing random reasoning; and
- training the meta learner so as to use a support set to represent the newly appearing entity.

The present invention further provides a knowledge graph reasoning model for Bayesian few-shot learning, wherein the knowledge graph reasoning model at least comprises:

- building a Gaussian mixture model based on entities and relations in a knowledge graph; and
- constructing a meta learner based on a graph neural network.

BRIEF DESCRIPTION OF THE DRAWINGS

FIG. 1 is a schematic logic diagram of a reasoning method for a knowledge reasoning model provided in an embodiment of the present invention.

DETAILED DESCRIPTION OF THE INVENTION

The present invention will be described in detail below with reference to accompanying drawings.

The present invention provides knowledge graph reasoning method, system and reasoning model based on Bayesian few-shot learning. The invention also provides an electronic device capable of running the knowledge graph reasoning method based on Bayesian few-shot learning of the present invention.

The electronic device in the present invention is an electronic device capable of running the knowledge graph reasoning program based on Bayesian few-shot learning, such as a server, a computer, a mobile computer, a smartphone, a application-specific processor, and so on.

The electronic device in the present invention includes at least a processor and a memory, wherein the processor is capable of running encoded information of the knowledge graph reasoning method based on Bayesian few-shot learning, and the memory is used to store the encoded information of the knowledge graph reasoning method. The knowledge graph reasoning system based on Bayesian few-shot learning of the present invention at least comprises a processor, which is capable of running the knowledge graph reasoning program based on Bayesian few-shot learning.

The processor of the present invention may also be a application-specific integrated chip, a microprocessor, and other electronic components capable of running the coded information of the knowledge graph reasoning method.

The knowledge graph reasoning system of the present invention may also include a first computing unit, a sampling computing unit, and a second computing unit.

The first computing unit is a processor or a application-specific integrated chip capable of building a Gaussian distribution model based on the entities and relations in the knowledge graph.

The sampling computing unit is a processor or an application-specific IC chip configured to execute meta-training process of newly appearing entities in a dynamic knowledge graph and perform task sampling. In other words, the sampling computing unit can operate encoded information that simulates dynamic, newly appearing entities and implements the step of task sampling.

The second computing unit is also referred to as a meta learner. It is a processor or an application-specific IC chip configured to operate encoded information that execute the representational function of the meta learner and implement the reasoning process.

The first computing unit is in data transmission with the second computing unit via at least one data port. The first computing unit is further provided with a data input port, for receiving data in the knowledge graph such as entities, relations, tail entities, etc.

The sampling computing unit is in data transmission communication with the first computing unit via at least one data transmission port, so as to receive the sampling data sent by the first computing unit. The data used may be, for example, entities emerging dynamically.

The sampling computing unit is in data transmission communication with the second computing unit via at least one data transmission port, so as to send the Gaussian mixture model to the second computing unit.

The knowledge graph reasoning system further comprises a storage unit, which is at least used to store information related to the process of knowledge graph reasoning, such as data, functions, and output results. The storage module may be for example a RAM, a ROM, a disc, a chip, or other storage medium. The storage unit is in data transmission communication with the first computing unit via at least one data transmission port, so that the first computing unit can call the required Gaussian mixture model data from the storage unit. The storage unit is in data transmission communication with the second computing unit via at least one data transmission port, so that the second computing unit can call the meta learner representation function, the score function, the loss function, and the objective function as required from the storage unit to train the meta learner and conduct knowledge graph reasoning.

As to information stored in the storage unit, functions at least include a Gaussian mixture model, a meta learner representation function, a score function, a loss function, and an objective function, and the data at least include a support set, a query set, a negative query set, and parameters, and the output results at least include newly appearing entities.

The method for knowledge graph reasoning based on Bayesian few-shot learning in the present invention, as shown in FIG. 1, at least comprising:

S1: building a Gaussian mixture model based on entities and relations in a knowledge graph so as to reduce uncertainty of the knowledge graph;

S2: taking each said entity as a task to simulate a meta-training process of a newly appearing entity in the dynamic knowledge graph and perform task sampling;

S3: constructing a meta learner based on a graph neural network and conducing random reasoning; and S4: training the meta learner so as to use a support set to represent the newly appearing entity.

The steps of the present invention will then be detailed below.

The step of building a Gaussian mixture model based on entities and relations in a knowledge graph is achieved by training the entity-relation link data of the knowledge graph itself into structural vector representations. In particular, this is about molding entities and relations in the knowledge graph into representations following probability distribution instead of a real number of vectorized representations, for fitting the uncertainty in the knowledge graph.

It is assumed that every entity and relation in the knowledge graph follow the same Gaussian distribution, thereby enabling approximation to statistical uncertainty. The head entity, the relation, and the tail entity are represented respectively as: $e_h \sim \mathcal{N}(\mu_h, \Sigma_h)$, $r \sim \mathcal{N}(\mu_r, \Sigma_r)$, $e_t \sim \mathcal{N}(\mu_t, \Sigma_t)$, where μ represents locations of the entity or the relation in a vector space, and Σ represents a covariance whose magnitude is in positive correlation with uncertainty of the relation or the entity.

Conversion from the head entity to the tail entity is represented as $(e_t - e_h) \sim \mathcal{N}(\mu_t - \mu_h, \Sigma_h + E_t)$. In the representation layer, the transformation makes the relation distribution $P_r$ close to the transformation distribution $P_e$ as much as possible.

A score function is defined based on KL divergence and the reliability of a triple is computed by using the score function.

KL divergence is used as a score function for measuring the reliability of knowledge graph triples. As posteriors of these Gaussian distributions become convergent in training, uncertainty in the knowledge graph will reduce and be fit.

KL divergence (Kullback-Leibler divergence) is measurement for asymmetry of the difference of two probability distributions P and Q.

The score function used to compute the reliability of the triple is: represents $$s(e_h, r, e_t) = KL(P_r, P_e),$$

where, s represents the score function of the triple, $e_h$ represents the head entity, r represents the relation, $e_t$ represents the tail entity, $P_r$ represents relation distribution, and $P_e$ transformation distribution.

In the present invention, task sampling is conducted by simulating the meta-training process of newly appearing entities in a dynamic knowledge graph.

As shown in FIG. 1, the observed first knowledge graph 3 is transformed into a second knowledge graph 4 containing newly appearing entities.

Task partitioning is about simulating entities appearing in the dynamic knowledge graph based on the meta-training process of task sampling. Specifically, an original dataset is partitioned into at least a meta training dataset containing simulated, newly appearing entities and a meta testing dataset containing real, newly appearing entities.

The simulated newly appearing entities are sampled based on the meta-training process of the meta training dataset. As shown in FIG. 1, during the meta training, every training task will have some newly appearing entities $$e_i'.$$

Every new entity has its corresponding support set 1 and query set 2. The support set is represented as:

$$S_i = \{(e_i', r_j, e_j)\}_{j=1}^{N}$$

and the query set is represented as:

$$Q_i = \{(e_i', r_j, e_j)\}_{j=N+1}^{n(e_i)}.$$

The support set refers to the set of N triples associated with the entity, and is used as the input of the meta learner to acquire the embedded representation of the entity. With N triples associated with the entity forming the support set, all of the remaining triples are included in the query set.

The purpose to have task sampling included in the meta-training process is to use the support set and the meta learner $f_\theta$ to represent newly appearing entities $$e_i',$$

and then use th score function to maximize the scores of the triples in the query set.

The score function when the triple is maximum is:

$$\max_\theta \mathbb{E}_{M_{tr}}\left[\frac{1}{|Q|}\sum_{j=N+1}^{n(e_i')} s(e_i', r_j, e_j)\right], e_i' = f_\theta(S_i).$$

In the present invention, the meta-training process is part of the meta learning framework. The meta learning framework can be divided into two sections, namely meta training, and meta testing. In the meta-training process, the parameters in the meta learner are trained and updated. Therein, the meta learner takes the support set in the meta-training process as its input and outputs the representation of the node and then the parameters in the meta learner are updated by using the data in the query set.

The purpose of task sampling is to divide the original dataset into a support set and a query set. In the present task, the support set is first input to the meta learner that generates an output, and then the data in the query set are used to compute deviation in the output and update the parameters.

$f_\theta$ is a function taking the support set as its input, and herein refers to the meta learner. The meta learner is a function that uses the support set as its input.

The meta learner is constructed on the basis of a graph neural network. The purpose is to transfer the knowledge in the original knowledge graph to the newly appearing entity through the support set. Given that a graph neural network has the ability to capture a graphic structure, the present invention uses a graph neural network to construct the meta learner. In the present invention, the meta learner can assemble heterogeneous neighbors of the entity, and output the representation of the newly appearing entity. The meta learner is studied in the meta training dataset $M_{tr}$, and then the trained meta learner is evaluated and updated in the meta testing dataset $M_{tr}$.

The meta learner forms the core of the meta learning framework and is mainly used to extract meta-knowledge. In the present invention, the meta learner is designed on the basis of a graph neural network. As shown in FIG. 1, the meta learner 5 takes the support set as its input to output embedded representations of entities. Then the deviation is computed through the query set, thereby realizing update of the parameters in the meta learner.

However, a knowledge graph is different from the traditional graph structure in that an edge in a knowledge graph represents relation, which is as important as an entity node. In view of the high uncertainty of newly appearing entities and the difference between a knowledge graph and the traditional graph structure, the present invention introduces a Bayesian neural network and the relation edges in a knowledge graph into the design of a graph neural network.

The meta learner is constructed based on the Bayesian neural network and relations in the knowledge graph.

The meta learner is represented as:

$$f_\theta = \frac{1}{|nei(\varsigma_i)|} \sum_{(r,e)\in neil(\varsigma_i)} B[r\|e],$$

where, $f(\theta)$ represents a weight value, B represents the Bayesian neural network, $|nei(\mathcal{S}_i)|$ represents the number of relation-entity pairs connected to the entity $$e_i'.$$

Delivered information is usually transformed through a weight matrix in a linear neural network. However, since reasoning for newly appearing entities is highly uncertain, the present invention constructs a model based on the weight value $f(\theta)$ and by learning prior distribution following Bayesian neural network and reasons uncertainty of emerging entities. After the meta learner is trained, the knowledge graph reasoning model can learn the variational approximation of the Bayesian posterior distribution. Since the weight value of the Bayesian neural network is uncertain, the output of the meta learner is a random variable, thereby achieving random reasoning.

In the present invention, the meta training dataset is used to train the meta learner. After well trained by the meta training dataset, the knowledge graph reasoning model learned by the meta learner can solve for real, new entities in the meta testing dataset. Upon completion of its training, the meta learner can use the support set to represent real, new entities, without fine-tuning and re-training.

The meta learner is trained using the meta training dataset through the following steps.

Every query set contains only positive triples $$Q_i = \{(e_i', r, e) | e \in E'\}.$$

In the meta-training process, for query sets having updated parameters, negatives query sets are constructed as:

$$Q_i^- = \{(e_i', r, e^-) | e \in E', e^- \in E\}.$$

A negative query set contains only incorrect triples while the query set contains only correct triples. The purpose to have negative query sets constructed is to help the model better identify negatives in the loss function.

Specifically, in a correct triple, some element is replaced by an arbitrary other element for enabling the model to differentiate positives from negatives.

The query set is represented as:

$$Q_i = \{(e_i, r_j, e_j)\}_{j=N+1}^{n(e_i)}.$$

The N triples associated with the entity will be the support set, and all the other triples will be placed in the query set, which is used to update the model parameters.

The principle by which the query set updates the parameters is that: by maximizing the score function of the triples in the query set to compute a gradient in the loss function and perform gradient descent to update the model parameters.

The loss function representation:

$$L = \sum_{(e_i',r,e)\in Q_i} \sum_{(e_i',r,e^-)\in Q_i^-} \min(\gamma + s(e_i', r, e) - s(e_i', r, e^-)\Big\};$$

The loss function is the ground for updating the model parameters. By computing the gradient in the loss function and performing gradient descent on the parameters, the parameters can be updated.

To query a newly appearing entity $$e_i',$$

the meta learner uses the support set $S_i$ as the input and the representation of $$e_i'$$

as the output, i.e., $$e_i' = f_{\theta \sim P_r(\theta|D)}(S_i),$$

where $f(\theta)$ represents the weight value, $S_i$ represents the support set, and $e_i'$ represents the newly appearing entity.

The weight value $f_\theta$ of the meta learner is sampled from the posterior distribution. Posterior sampling ensures uncertainty, thereby realizing random reasoning.

Since the posterior distributions $Pr(\theta|D)$ is difficult to solve, the present invention adopts a variational method, which uses a distribution $q_6$ defined by the parameter $\theta$ to approximate the real posterior distribution $Pr(\theta|D)$. By minimizing KL divergence between the prior distribution and the posterior distribution, the present invention transforms a task of identifying the posterior distribution into an optimization task for finding out the optimal parameter θ.

The step of minimizing KL divergence between the prior distribution and posterior distribution includes:

$$L(\theta^*) = \min_{\theta} KL(q(\theta) \| Pr(\theta \mid D));$$

so that an objective function is represented as:

$$L(\theta) = KL((q(\theta) \| Pr(\theta)) - \mathbb{E}_{\theta \sim q(\theta)}[\log Pr(D|\theta)];$$

where, q(θ) represents a hypothesis distribution for fitting Pr(θ), Pr(θ) represents real distribution of the parameter, and Pr(D|θ) represents distribution of the training dataset.

After sufficient training of the meta training dataset, the model after learning can solve for the real, newly appearing entity in the meta testing dataset. In meta testing, every newly appearing entity has its own support set and query set. After the meta learner finishes training, the meta learner can use its support set to represent real, newly appearing entities, without fine-tuning and re-training.

The newly appearing entities in the meta training dataset $M_{tr}$ include:

the corresponding support set $$S_i = \{(e_i', r_j, e_j)\}_{j=1}^{N}, \text{ and}$$

query set $$Q_i = \{(e_i', r_j, e_j)\}_{j=N+1}^{n(e_i)};$$

where, $$n(e_i')$$

represents a number or triples adjacent to the newly appearing entity, N represents a few-shot size, and $$e_i'$$

represents the newly appearing entity.

After the meta learner is well trained using the meta training dataset $M_{tr}$, the learned knowledge reasoning model can solve real, emerging entities in the meta testing dataset $M_{tr}$. In meta testing, every newly appearing entity has its own support set and query set. After finishing the training, the meta learner is able to use its support set to represent the real, newly appearing entities, without fine-tuning.

The present invention further provides a knowledge graph reasoning model for Bayesian few-shot learning, wherein the knowledge graph reasoning model at least comprises: building a Gaussian mixture model based on entities and relations in a knowledge graph; and constructing a meta learner based on a graph neural network.

The meta learner is represented as:

$$f_\theta = \frac{1}{|nei(\varsigma_i)|} \sum_{(r,e) \in neil(\varsigma_i)} B[r \| e],$$

where, f(θ) represents a weight value, B represents the Bayesian neural network, $|nei(\mathcal{S}_i)|$ represents a number of relation-entity pairs connected to the entity $$e_i'; \text{ and}$$

modeling based on the weight value f(θ), and by learning prior distribution following the Bayesian neural network, and reasoning uncertainty of newly emerging entities.

As shown in FIG. 1, the meta learner is trained by using the support set $S_i$ as the input and the representation of $$e_i'$$

as the output, $$e_i' = f_{\theta \sim P_r(\theta|D)}(S_i),$$

wherein f(θ) represents the weight value, $S_i$ represents the support set, and $$e_i'$$

represents the newly appearing entity.

The knowledge graph reasoning model further includes a loss function. In the process of training the meta learner, the gradient in the loss function is calculated using the query set and the negative query set, thereby updating and optimizing parameters of the knowledge graph reasoning model based on the gradient descent data.

The knowledge graph reasoning model further comprises an objective function:

$$L(\theta) = KL((q(\theta) \| Pr(\theta)) - \mathbb{E}_{\theta \sim q(\theta)}[\log Pr(D|\theta)];$$

where, q(θ) represents a hypothesis distribution for fitting Pr(θ), Pr(θ) represents real distribution of the parameter, and Pr(D|θ) represents distribution of the training dataset. In the present invention, the knowledge graph reasoning model further comprises a score function for scoring reliability of triples.

The principle on which the knowledge graph reasoning model is implemented is now explained.

First, entities and relations in a knowledge graph are molded into the form of Gaussian distributions to fit uncertainty. This method is mainly implemented by using a meta learning framework, which include two parts, namely meta training, and meta testing.

The knowledge graph reasoning model has to receive meta-training. In the meta-training process, the dataset is divided into a support set and a query set. In order to learn meta-knowledge in the dataset, the support set of some newly appearing entity is input to the meta learner so as to obtain the embedded representation of the present entity. The representation is then introduced into the query set for calculating scores of triples, and gradient optimization is performed on the parameters of the meta learner, so as to get the trained parameters.

Upon completion of the meta-training process, with the optimized parameters, the knowledge graph model can be directly deployed to real-world scenarios to input the triples associated with the entity, which are the support set during meta testing, into the meta learner to get the embedded representation of the newly appearing entity. Afterward, the reasoning task is accomplished using the present embedded representation.

The chip or processor loaded with the disclosed method for knowledge graph reasoning based on Bayesian few-shot learning is generally deployed in a commercial server of a service provider, such as Dell R-740 server. The disclosed method is realized by Pytorch framework and the data to be processed could be exchanged between CPU and GPU of the server. Pytorch framework could realize computing of tensor in GPU, and the computing efficiency of tensor in GPU is much higher than that in CPU.

The chip or processor loaded with the disclosed method for knowledge graph reasoning based on Bayesian few-shot learning could be applied in a recommendation system. In a recommendation system, with the incoming of new users, a phenomenon called as "cold boot" comes along, which means that there is little usable data of the new users and it is difficult to provide precise recommendation service to the new users. The disclosed method could represent the users and items in the recommendation system as nodes, and represent click behavior or purchase behavior of a user to an item as a relation between the two, for example, (user1, click, item1), (user1, purchase, item2), wherein the relation forms the edge of the graph. In this way, a knowledge graph is constructed, and association between users and items is represented in the form of graph data. For new users in the "cold boot" problem, few-shot learning is performed to the new users. As there are few operations associated with new users, the number of related triples is quite small, high-efficiency modeling of users in this few-shot scenario is necessary.

The data to be processed in the disclosed method is triples which constitute the knowledge graph, triplet set of head entities, relations and tail entities. Taking knowledge graph of a recommendation system as an example, the knowledge graph is based on triples of interactions between users and items. These data would be provided by the service providers and these triples would be the input of the processor. Based on the Pytorch framework, these data would be transformed into tensors. Firstly, the CPU reads the data from SSD or HDD, then the CPU transmits the tensor data to memory of the GPU for tensor computing.

The processed data, for example, recommendation results based on user behavior, are sent to user end through the network, which depends on the equipment of the user, whether it is a cellphone or a personal computer. Then the reasoning service of the service provider to the clients based on knowledge graph, such as precise recommendation of the recommendation system to new users is finally realized.

After the processor completes data processing, the data would be sent from network port of the server to network port of the user end through local network operator, so as to realize user service.

It should be noted that the above-mentioned specific embodiments are exemplary, and those skilled in the art can come up with various solutions inspired by the disclosure of the present invention, and those solutions also fall within the disclosure scope as well as the protection scope of the present invention. It should be understood by those skilled in the art that the description of the present invention and the accompanying drawings are illustrative rather than limiting to the claims. The protection scope of the present invention is defined by the claims and their equivalents. The description of the present invention contains a number of inventive concepts, such as "preferably", "according to a preferred embodiment" or "optionally", and they all indicate that the corresponding paragraph discloses an independent idea, and the applicant reserves the right to file a divisional application based on each of the inventive concepts.

What is claimed is:

1. A method for knowledge graph reasoning based on Bayesian few-shot learning, comprising:

configuring a computer processor to perform the steps of:

(a) building, in a first computing unit, a Gaussian mixture model based on entities and relations in a knowledge graph so as to reduce uncertainty of the knowledge graph;

(b) taking, in a sampling computing unit, each said entities as a task to simulate a meta-training process of a newly appearing entity in the dynamic knowledge graph and perform task sampling, wherein the sampling computing unit is configured to execute metatraining process of newly appearing entities in a dynamic knowledge graph and perform task sampling;

(c) constructing, in a second computing unit, a meta learner based on a graph neural network and conducing random reasoning, wherein the second computing unit is configured to operate encoded information that execute the representational function of the meta learner and implement a reasoning process; and (d) training, in the second computing unit, the meta learner so as to use a support set to represent the newly appearing entity, wherein the first computing unit is in data transmission with the second computing unit via at least one data port, wherein the sampling computing unit is in data transmission communication with the first computing unit via at least one data transmission port, so as to receive sampling data sent by the first computing unit, and wherein the sampling computing unit is in data transmission communication with the second computing unit via at least one data transmission port, so as to send the Gaussian mixture model to the second computing unit, wherein the first computing unit and the second computing unit are in data transmission communication with a storage unit via at least one data transmission port, wherein the storage unit stores information that comprises a Gaussian mixture model, a meta learner representation function, a score function, a loss function, an objective function, data comprising a support set, a query set, a negative query set, and parameters, and output results that comprise newly appearing entities, wherein the first computing unit can call required Gaussian mixture model data from the storage unit, wherein the second computing unit can call meta learner representation function, score function, loss function, and objective function as required from the storage unit to train the meta learner and conduct knowledge graph reasoning, wherein step (a) comprises:

representing the head entity, the relation, and the tail entity as:

$$e_h \sim N\left(\mu_h, \sum_h\right),\ r \sim N\left(\mu_r, \sum_r\right),\ e_t \sim N\left(\mu_t, \sum_t\right),$$

wherein $e_h$ represents the head entity, r represents the relation, $e_t$ represents the tail entity, μ represents locations of the entity or the relation in a vector space, and Σ represents a covariance whose magnitude is in positive correlation with uncertainty of the relation or the entity;

representing conversion from the head entity to the tail entity as $$(e_t - e_h) \sim N\left(\mu_t - \mu_h, \sum_h + \sum_t\right);$$

wherein step (c) comprises:

constructing the meta learner based on the Bayesian neural network and relations in the knowledge graph, wherein the meta learner is represented as:

$$f_\theta = \frac{1}{|nei(\varsigma_i)|} \sum_{(r,e) \in neil(\varsigma_i)} B[r \| e],$$

wherein, $f(\theta)$ represents a weight value, B represents the Bayesian neural network, $|nei(\mathcal{S}_i)|$ represents a number of relation-entity pairs connected to the entity $$ei',$$

r represents the relation, e represents the tail entity; and modeling based on the weight value $f(\theta)$, and by learning prior distribution following the Bayesian neural network, and reasoning uncertainty of newly emerging entities, wherein step (d) comprises:

computing a gradient in a loss function based on the query set and a negative query set, thereby updating and optimizing parameters of a reasoning model of the knowledge graph based on gradient descent data; and training the meta learner with the support set Si taken as an input and a representation of $e_i'$ taken as an output, $$e_i' = f_{\theta \sim P_r(\theta|D)}(S_i),$$

wherein, $f(\theta)$ represents the weight value sampled from the posterior distribution, thus ensuring uncertainty and realizing random reasoning, $S_i$ represents the support set, and $e_i'$ represents a newly appearing entity, and wherein upon completion of training with the support set Si, the meta learner uses the support set Si to represent real, new entities without fine-tuning and re-training.

2. The method for knowledge graph reasoning based on Bayesian few-shot learning according to claim 1, wherein the score function used to compute the reliability of the triple is:

$$s(e_h, r, e_t) = KL(P_r, P_e),$$

where, s represents the score function of the triple, $e_h$ represents the head entity, r represents the relation, $e_t$ represents the tail entity, KL represents Kullback-Leibler divergence, $P_r$ represents relation distribution, and $P_e$ represents transformation distribution.

3. The method for knowledge graph reasoning based on Bayesian few-shot learning according to claim 2, wherein the processor is configurated for performing the step of taking each said entity as a task to simulate a meta-training process of a newly appearing entity in the dynamic knowledge graph and perform task sampling by:

partitioning an original dataset into at least a meta training dataset that contains simulated newly appearing entity and a meta testing dataset that contains actual newly appearing entity;

sampling the simulated newly appearing entity based on a meta-training process of the meta training dataset; and maximizing a score of the triple of the query set based on a score function.

4. The method for knowledge graph reasoning based on Bayesian few-shot learning according to claim 1, wherein the processor is further configurated for performing the step of training the meta learner further by:

minimizing KL divergence between the prior distribution and posterior distribution:

$$L(\theta^*) = \min_\theta KL(q(\theta) \| Pr(\theta \mid D));$$

so that an objective function is represented as:

$$L(\theta) = KL((q(\theta) \| Pr(\theta)) - \mathbb{E}_{\theta \sim q(\theta)}[\log Pr(D|\theta)];$$

wherein, $L(\theta)$ represents the objective function, $q(\theta)$ represents a hypothesis distribution for fitting $Pr(\theta)$, $Pr(\theta)$ represents real distribution of the parameter, $Pr(\theta|D)$ represents the posterior distributions and $Pr(D|\theta)$ represents distribution of the training dataset.

5. The method for knowledge graph reasoning based on Bayesian few-shot learning according to claim 4, wherein the newly appearing entities in the meta training dataset $M_{tr}$ include:

the corresponding support set $$S_i = \left\{\left(e_i^i, r_j, e_j\right)\right\}_{j=1}^N$$

and query set $$Q_i = \{(e_i', r_j, e_j)\}_{j=N+1}^{n(e_i)};$$

where, $n(e_i')$ represents a number of triples adjacent to the newly appearing entity, N represents a few-shot size, and $e_i'$ represents the newly appearing entity.

6. A system for knowledge graph reasoning based on Bayesian few-shot learning, comprising:

a processor configured to perform the method of claim 1; and a storage unit.

* * * * *